(12) United States Patent
Fischer et al.

(10) Patent No.: US 7,731,270 B2
(45) Date of Patent: Jun. 8, 2010

(54) VEHICLE SLIDING DOOR TRAVEL EXTENSION SYSTEM

(75) Inventors: David R. Fischer, Bloomfield Hills, MI (US); Teru Tseng, Troy, MI (US); Edward M. Sanocki, Clawson, MI (US); James A. Rochon, Sterling Heights, MI (US); Eric A. Watterworth, Orion, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 211 days.

(21) Appl. No.: 12/045,723

(22) Filed: Mar. 11, 2008

(65) Prior Publication Data

US 2009/0230724 A1    Sep. 17, 2009

(51) Int. Cl.
*B60J 5/06* (2006.01)
(52) U.S. Cl. .......................................... 296/155; 49/213
(58) Field of Classification Search .................. 296/155, 296/146.12, 146.1, 146.5, 146.9; 49/213–215, 49/360, 362
See application file for complete search history.

(56) References Cited

U.S. PATENT DOCUMENTS

| | | | |
|---|---|---|---|
| 4,268,996 A * | 5/1981 | Allen | 49/212 |
| 6,036,257 A | 3/2000 | Manuel | |
| 6,926,342 B2 * | 8/2005 | Pommeret et al. | 296/155 |

* cited by examiner

*Primary Examiner*—Dennis H Pedder
*Assistant Examiner*—Melissa A Black

(57) ABSTRACT

A door bracket is mounted to a vehicle sliding door. A primary track is mounted along a side and extends to a remote end. A roller bracket having rollers received by the primary track is movable between a first position proximate the opening and a second position at the remote end. A link is pivotally joined to the roller bracket by a first pivot and pivotally joined to the door bracket by a second pivot. The link is rotatable around the first pivot between a first orientation and a second orientation. The link comprises an extension arm extending from the link toward the primary track. A shift mechanism contacts the extension arm when the roller bracket is at an intermediate trip point so that the link shifts from its first orientation to its second orientation when the sliding door is being opened.

13 Claims, 7 Drawing Sheets

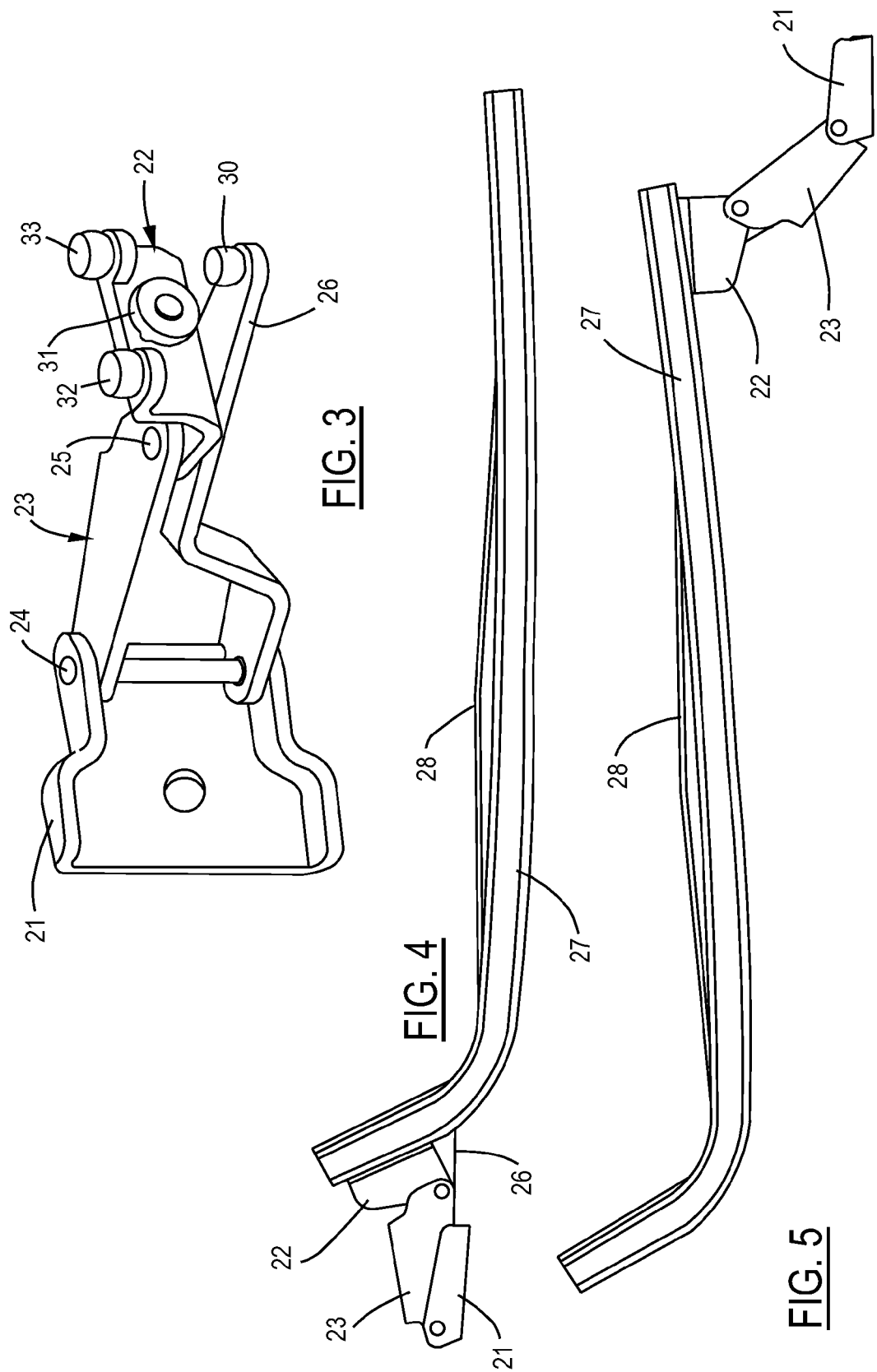

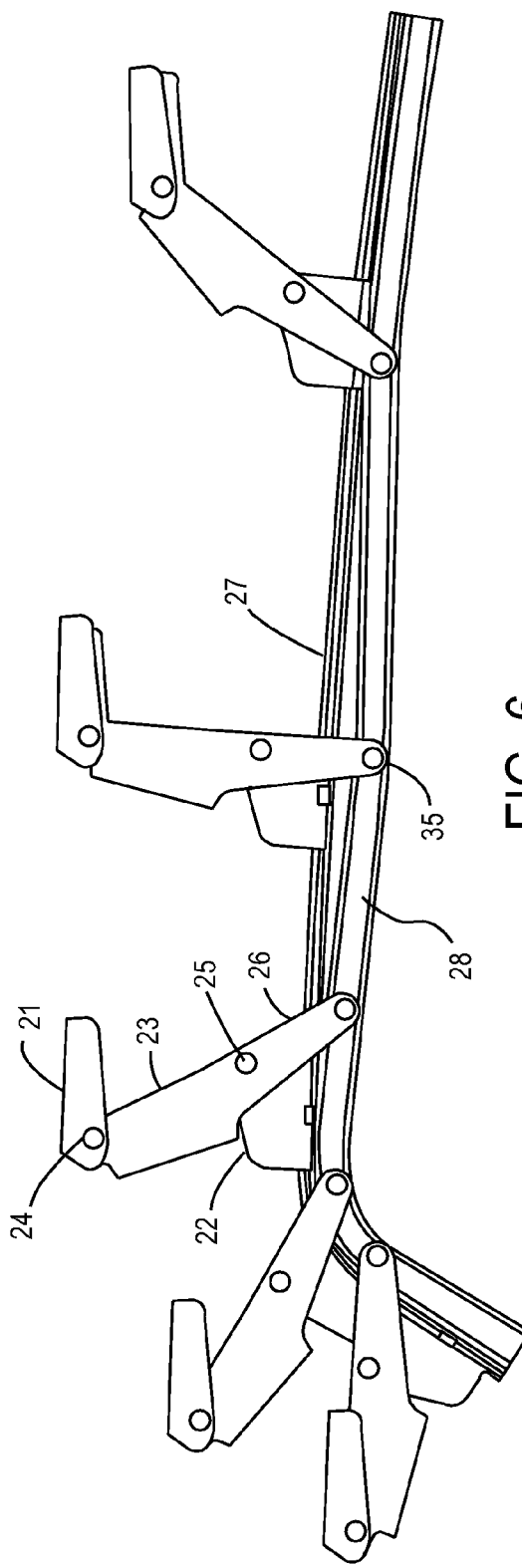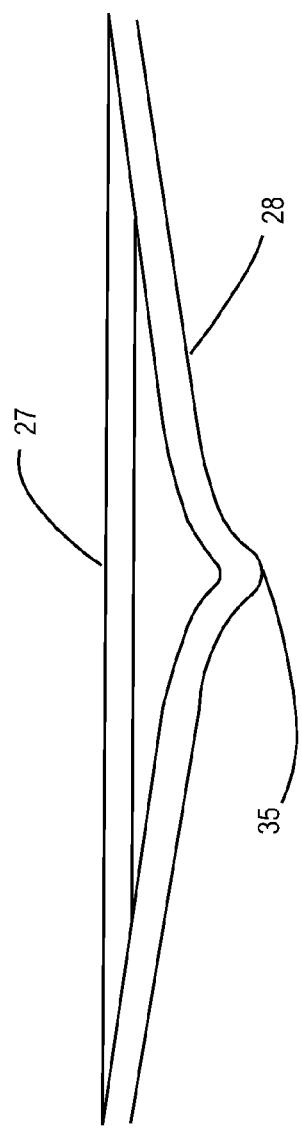

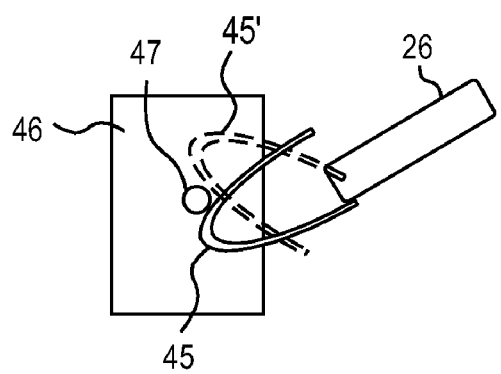
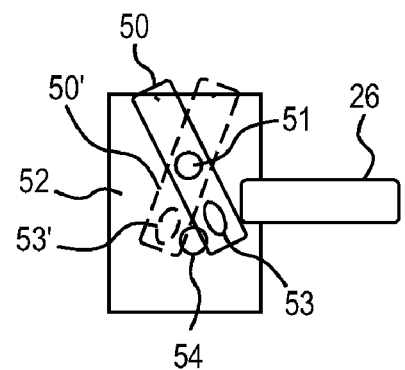
FIG. 10  FIG. 11
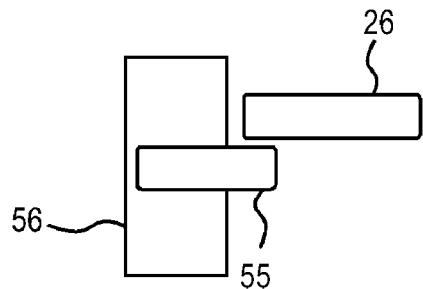
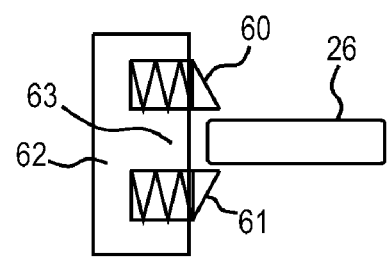
FIG. 12  FIG. 13
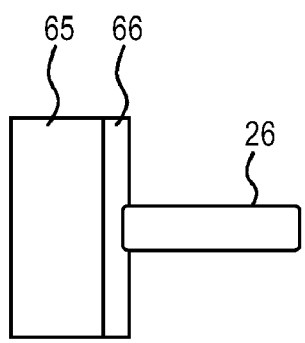
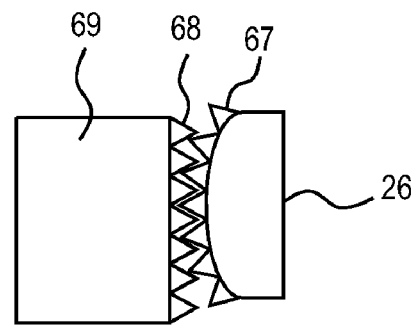
FIG. 14  FIG. 15

VEHICLE SLIDING DOOR TRAVEL EXTENSION SYSTEM

BACKGROUND OF INVENTION

The present invention relates generally to vehicular sliding doors in which the rearward side of the sliding door is supported by a roller bracket that traverses a roller track mounted along the exterior side of the vehicle.

A typical sliding door for a passenger vehicle such as a van, minivan, or a crossover vehicle is supported and guided by upper and lower roller bracket assemblies at the front edge of the sliding door and a center roller bracket assembly attached to the rear edge of the door.

The size of the door opening that may be uncovered when the sliding door opens is limited to the available distance of rearward travel for the door. A large door opening is desired for ease of ingress/egress and for maximizing the size of loads that may pass through the door opening. However, door travel is typically limited by the length of the tracks in which the roller bracket assemblies traverse during opening of the sliding door. The center track, which receives a roller bracket mounted to the rearward edge of the sliding door, cannot extend beyond the back edge of the vehicle body. The presence of rear taillight assemblies may further limit the available space for the center track. In addition, it is desired to minimize the length of the track to reduce its visibility for aesthetic purposes. Therefore, the open door space for ingress/egress in prior art vehicles has been undesirably limited.

SUMMARY OF INVENTION

In order to extend the travel of the sliding door beyond the position that would otherwise result when the roller bracket reaches the end of the track, a link joining the roller bracket to the door pivots to a different orientation under control of a shift mechanism as it moves past an intermediate trip point, adding to the opening distance traversed by the sliding door.

Thus, in one aspect of the invention, an apparatus is provided for supporting a sliding door that moves between a closed position and a fully open position to selectively cover an opening in a vehicle. A door bracket fixedly mounts to the sliding door. A primary track is mounted along an exterior side of the vehicle and extends away from the opening to a remote end. The length of the primary track from the opening to the remote end is less than the distance traveled by the sliding door between the closed position and the fully open position. A roller bracket having rollers received by the primary track is movable between a first position proximate the opening and a second position at the remote end of the primary track. A link is pivotally joined to the roller bracket by a first pivot and pivotally joined to the door bracket by a second pivot. The link is rotatable around the first pivot between a first orientation for positioning the sliding door toward its closed position and a second orientation for positioning the sliding door toward the fully open position. The link comprises an extension arm extending from the first pivot on the link generally toward the primary track. A shift mechanism contacts the extension arm when the roller bracket is at an intermediate trip point between the first position and the second position so that the link shifts from its first orientation to its second orientation when the sliding door is being opened and so that the link shifts from its second orientation to its first orientation when the sliding door is being closed.

BRIEF DESCRIPTION OF DRAWINGS

FIG. 3 is a perspective view showing a first embodiment of a sliding door support apparatus of the invention.

FIG. 4 is a top view showing a roller bracket at the closed position in a track.

FIG. 5 is a top view showing the roller bracket near the fully open position in the track.

FIG. 6 is a bottom view showing progressive movement of the roller bracket and shifting of the extension arm at different positions along the track.

FIG. 7 is a bottom view showing a primary track and a substantially parallel secondary track having an asymptotic shape.

FIG. 10 shows an alternative embodiment of the shift mechanism utilizing a cup.

FIG. 11 shows an alternative embodiment of the shift mechanism utilizing a rocker bar.

FIG. 12 shows an alternative embodiment of the shift mechanism utilizing a pin.

FIG. 13 shows an alternative embodiment of the shift mechanism utilizing a spring latch.

FIG. 14 shows an alternative embodiment of the shift mechanism utilizing a frictional surface.

FIG. 15 shows an alternative embodiment of the shift mechanism utilizing a gear rack.

DETAILED DESCRIPTION

Figure 1:
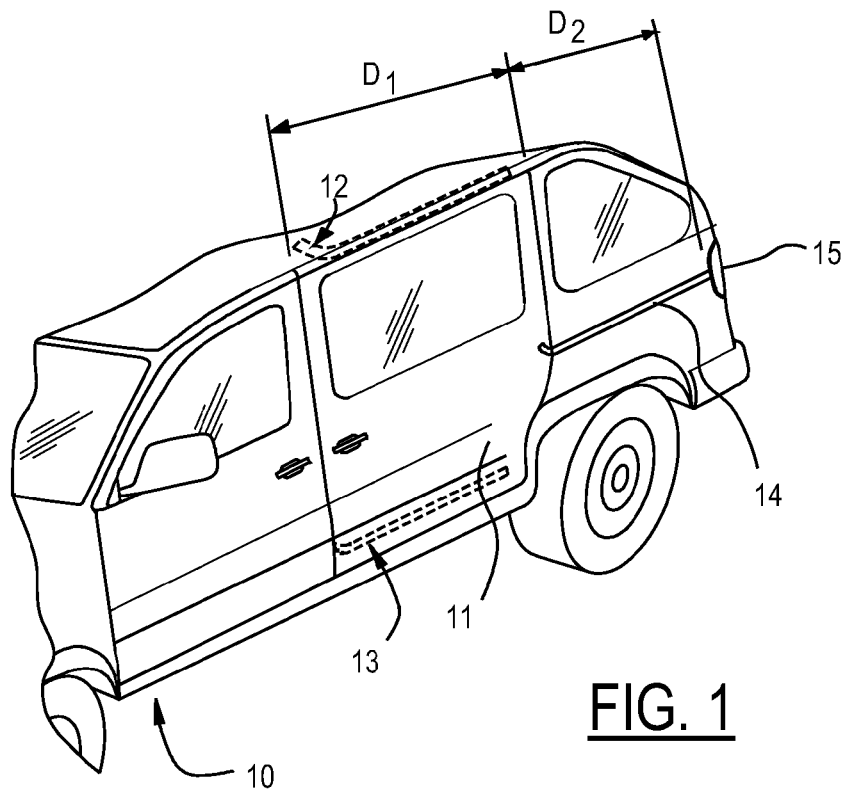
FIG. 1 is a perspective view showing a vehicle with a sliding door in the closed position.

Referring now to FIG. 1, a vehicle 10 has a sliding door 11 supported along an upper roller track 12, a lower roller track 13, and a center roller track 14. Respective roller brackets (not shown) slidable in each track are joined to respective door brackets (not shown) on the interior side of sliding door 11. In a conventional system, a pair of brackets at the top and bottom of the forward edge of sliding door 11 are joined to the roller brackets sliding in tracks 12 and 13, respectively. A door bracket attached at the center rear edge of sliding door 11 is coupled to a roller bracket slidably received in track 14. The tracks have initial portions which move radially outward so that the door first moves outward from the vehicle body in order to clear the vehicle body and then slides toward the rear of vehicle 10. Because of this compound movement, each roller bracket is pivotally connected to its respective door bracket.

Sliding door 11, and the opening in vehicle 10 which receives sliding door 11, each have a front-to-back width designated $D_1$. For conventional sliding doors, the rearward movement of sliding door 11 has a maximum distance designated $D_2$ which is the length of center track 14 from the edge of the door opening to the end of track 14. The space available for track 14 is limited by the overall length of vehicle 10, and may be even more limited by the presence of other structures such as a taillight 15. If distance $D_2$ is less than distance $D_1$, then when a conventional sliding door 11 is at its maximum rearward travel position it continues to block a portion of the door opening. It would be desirable to obtain an extension of the sliding door travel without increasing the length of the corresponding center track.

Figure 2:
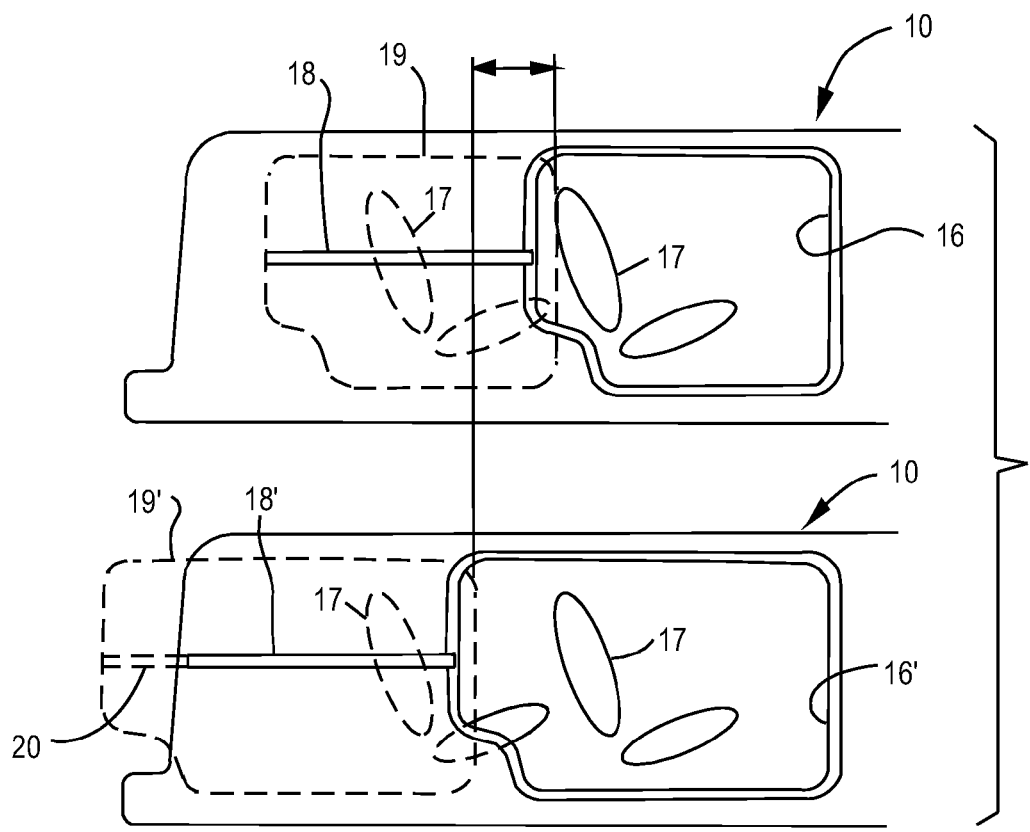
FIG. 2 is a diagram showing the relationship between door opening size and sliding door travel for a vehicle body having a particular length.

As shown in FIG. 2, vehicle 10 may have a side passenger opening 16 allowing ingress/egress to and from seats 17. In the upper half of FIG. 2, opening 16 is sufficiently small compared to the length of the vehicle behind opening 16 that a center track 18 can be accommodated on vehicle 10 to allow opening of the sliding door to a position 19 using conventional door sliders. In the lower half of FIG. 2, a larger (i.e., wider) opening 16' allows easier ingress and egress to rear seat 17. However, the remaining length of the vehicle for accommodating track 18' is insufficient. Therefore, the sliding door cannot be moved to a desired position 19' using the conventional sliding door support apparatus. Track 18' would need to extend through area 20 in order to provide a wider door opening 16'.

The present invention incorporates a link between a door mounted hinge and a body-side roller bracket to allow extended travel of the sliding door beyond the end of the track. The invention incorporates a mechanism to ensure the transition of the link orientation from forward facing to rearward facing during sliding door travel, thereby providing a smooth and easy operation of the sliding door.

As shown in FIG. 3, a door bracket 21 for affixing to an interior side of a sliding door (not shown) is joined to a roller bracket 22 by a link 23. The connections of link 23 to door bracket 21 and roller bracket 22 are pivot connections using pivot pins 24 and 25, respectively. Link 23 has an extension arm 26 which extends from pivot 25 of link 23 generally toward the primary track. Preferably, extension arm 26 is integrated or continuous with link 23, such as by a single metal stamping. Extension arm 26 has a roller 30 that engages a secondary track to control the link orientation. Roller bracket 22 carries rollers 31, 32, and 33 for traversing a primary track as is described below.

FIGS. 4 and 5 are top views showing the door support apparatus in two different locations along a primary track 27. In FIG. 4, roller bracket 22 is in an initial portion of primary track 27 which is radially sloped toward the interior of the vehicle so that the sliding door may have an outward motion from its closed position. Due to the pivot connection between door bracket 21 and link 23, the longitudinal surface of door bracket 21 always remains substantially parallel to the side of the vehicle. Link 23 is pivoted such that the sliding door is positioned toward its closed position when roller bracket 22 is in this initial position.

As shown in FIG. 5, after the sliding door has been brought toward the rear end of track 27, link 23 is reoriented to a second orientation for positioning the sliding door toward the fully open position by interaction of extension arm 26 with secondary track 28.

FIG. 6 provides a bottom view showing the interaction of extension arm 26 with secondary track 28 for reorienting link 23 as roller bracket 22 progressively moves in primary track 27 in either direction. Because of pivot connection 24, door bracket 21 maintains an alignment substantially parallel to the side of the vehicle. Secondary track 28 is substantially parallel with primary track 27, but has a slightly asymptotic shape with a maximum separation from primary track 27 at an intermediate trip point 35. At intermediate trip point 35, link 23 is halfway between the first and second orientations corresponding to the fully closed and fully opened door orientations. By providing a gradual reorientation of the link, smooth door operation is obtained.

FIG. 7 shows an alternative embodiment of secondary track 28 with an asymptotic shape providing intermediate trip point 35 at a single point of maximum separation between the tracks (shown at a greatly exaggerated scale for the purpose of showing the overall shape with greater clarity). The asymptotic shape of secondary track 28 creates a shift mechanism for contacting the extension arm to shift the link between its first and second orientations.

Figure 8:
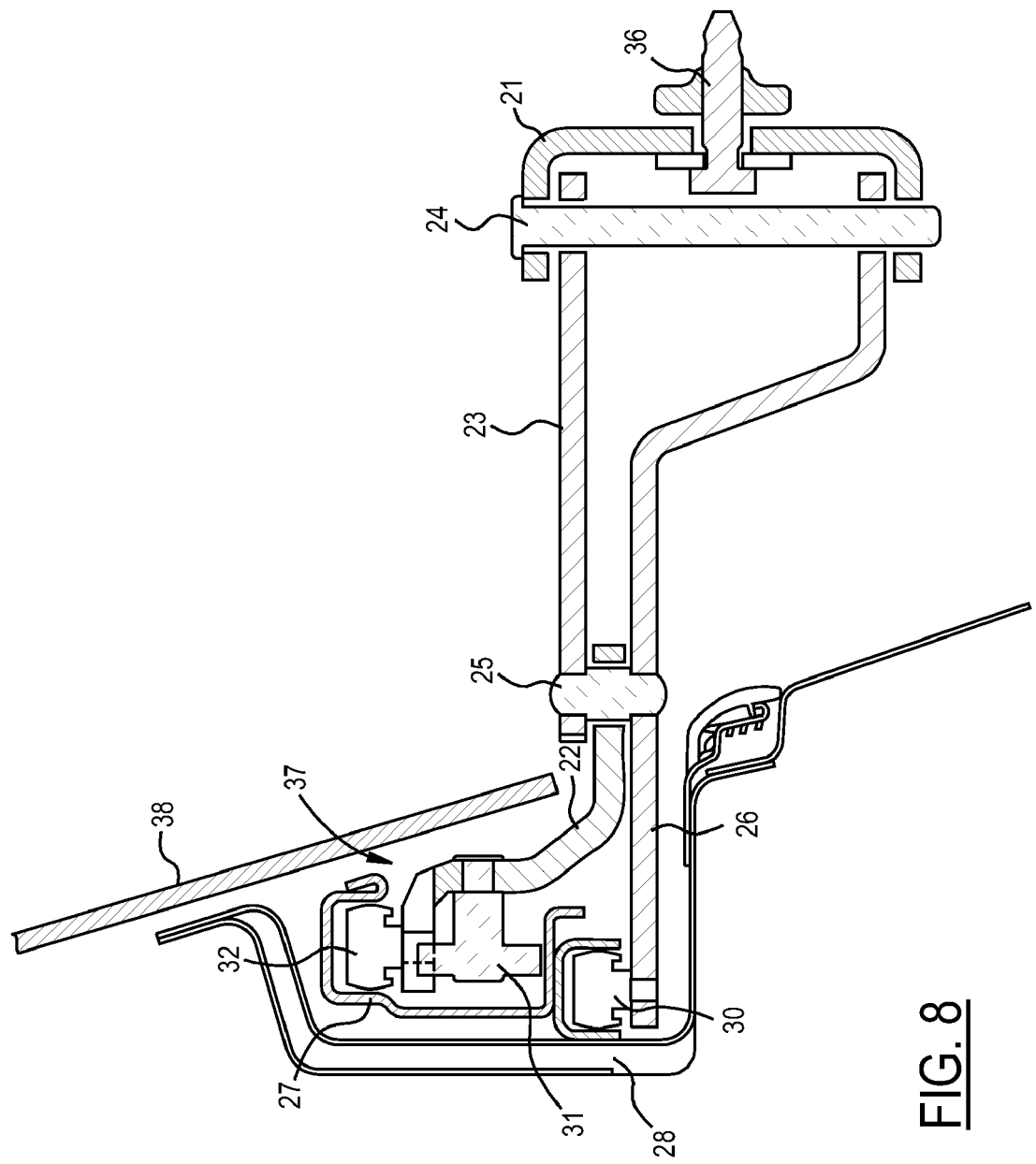
FIG. 8 is a cross-sectional view showing the door support apparatus and the tracks with the roller bracket at an intermediate trip point.

FIG. 8 shows in cross-section the sliding door support apparatus and the vehicle tracks mounted to a vehicle. A fastener 36 mounts door bracket 21 to a sliding door (not shown). The vehicle has a track space 37 behind a body panel 38 for mounting tracks 27 and 28 to the vehicle by a fastener 39. Thus, roller bracket 22 can freely slide rearward and forward along track 27 while supporting the weight of the door. Moreover, the changing separation between the paths of the rollers within primary and secondary tracks 27 and 28 (as projected onto a horizontal plane) controls the orientation of link 23, as described above.

Figure 9A:
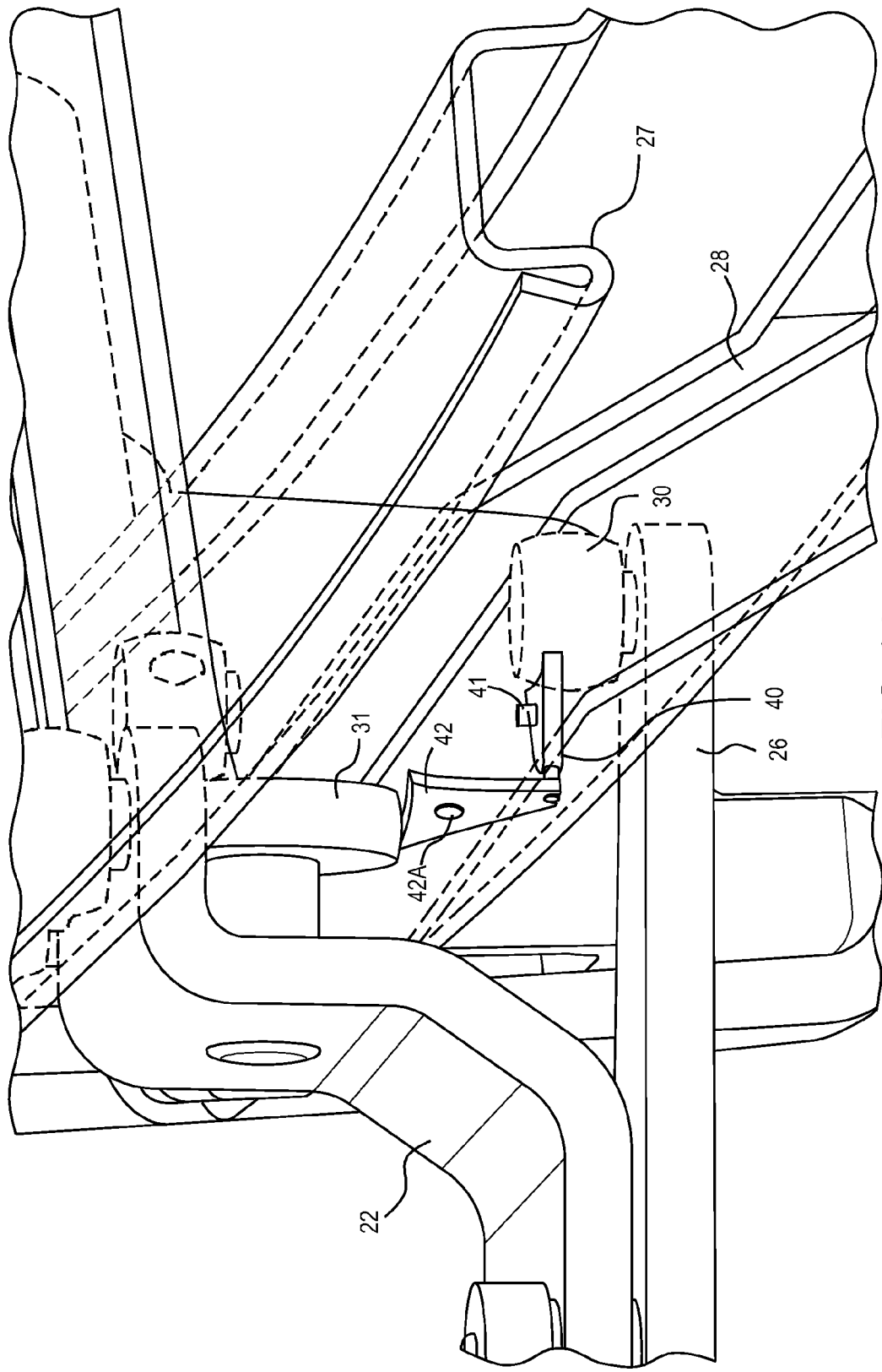
FIG. 9A is a perspective view showing a supplemental shift mechanism at the intermediate trip point.

For increased robustness, an additional shift mechanism may be utilized as shown in FIG. 9A. When roller 30 of extension arm 26 is at intermediate trip point 35 where it has its maximum separation from the path of the primary track, an assist rocker 40 mounted for pivotal movement on a pin 41 temporarily restrains roller 30 to ensure a coordinated transition between front-facing and rear-facing orientations. A counter-rotating assist rocker 42 mounted for pivotal movement on a pin 42 and interlocking with assist rocker 40 is displaced by contact with roller 31 to control the capture and release of roller 30. A detent mechanism (not shown) would preferably keep rockers 40 and 42 in place when the rollers are not engaged.

Figure 9B:
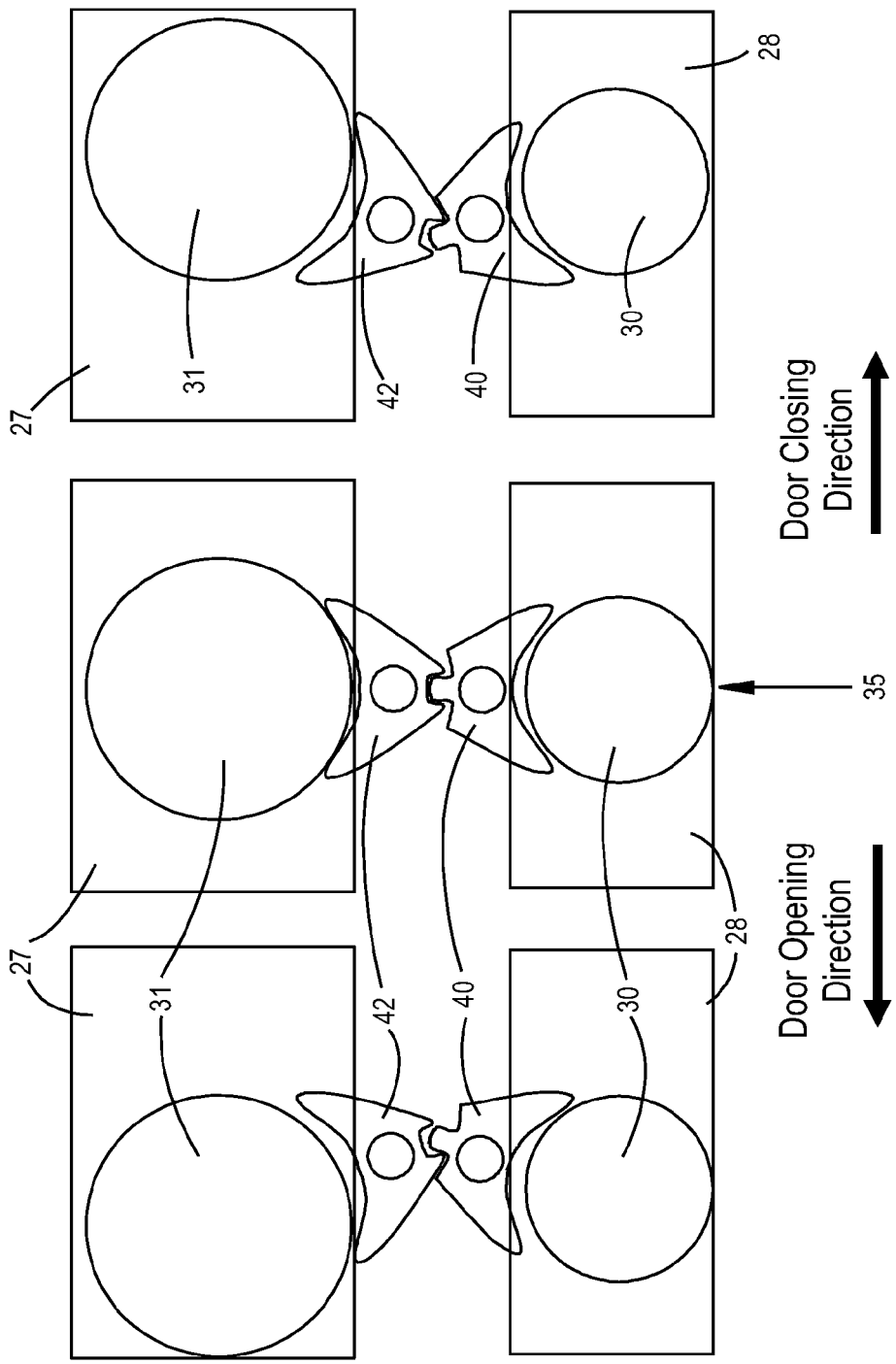
FIG. 9B is a diagram showing operation of the shift mechanism of FIG. 9A.

FIG. 9B shows the stages of the function of rockers 40 and 42. Although the pivot axes of rockers 40 and 42 are preferably perpendicular, they are shown as parallel in FIG. 9B to better visualize their operation. In the opening process, as roller 30 nears the intermediate trip point 35, it is restrained from further travel in the opening direction by rocker 40, as shown on the right side of FIG. 9B. Rocker 40 is held by rocker 42 in this initial position, which is in turn restrained by roller 31. As roller 31 reaches intermediate trip point 35 (as shown in the center panel of FIG. 9B), it causes rocker 42 to rotate while restraining roller 30. As roller 31 translates further in the opening direction, it causes rocker 42 to move into its second position, which in turn causes rocker 40 to rotate into its second position, releasing roller 30 to continue in the opening direction but preventing it from traveling in the closing direction, thereby assuring proper transition of the extension arm 26 from its first orientation to its second orientation.

Other shift mechanisms can be located at the intermediate trip point for re-orienting the link. As shown in FIG. 10, a rotating cup 45 may be mounted to a support block 46 at or adjacent to the intermediate trip point (e.g., just below the primary track) for interfacing with extension arm 26. As extension arm 26 moves toward cup 45, it is captured in cup 45 and pushes against the side of cup 45. The only movement of cup 45 is rotation over a limited range. Thus, as the roller bracket continues to move, extension arm 26 is forcibly reoriented by the reaction of cup 45. Cup 45 eventually rotates to a new position 45' so that extension arm 26 can escape after it has been reoriented. The same cup position is maintained so that extension arm 26 can be again captured when moving back in the opposite direction. A detent 47 is provided on block 46 for providing resistance against rotation of cup 45 between its two positions, and thereby both maintaining the desired position of cup 45 when extension arm is not present, and adding to the resistance that causes extension arm 26 to reorient.

FIG. 11 shows a rocker bar 50 which operates similarly to the cup. Rocker bar 50 is pivotally mounted on a pivot pin 51 on a block 52. Rocker bar 50 includes a detent feature 53 for interacting with a mating detent feature 54 on block 52, thereby providing two preferred positions for rocker 50 as shown at 50 and 50'. When extension arm 26 moves past the intermediate trip point, it interfaces with rocker bar 50 which provides the necessary force for reorienting extension arm 26. As shown in FIG. 12, a rigid pin 55 mounted to a block 56 at the intermediate trip point may also be used to interface with extension arm 26; however, the reorientation of extension arm 26 may operate less smoothly.

As shown in FIG. 13, a pair of spring loaded extensions 60 and 61 mounted with an intervening gap 63 on a mounting block 62 at the intermediate trip point can also be provided for reorienting extension arm 26 by means of a spring latch. The end surfaces of extensions 60 and 61 are ramped so that as extension arm 26 approaches the intermediate trip point, the first extension is compressed against its spring allowing extension arm 26 to enter gap 63. Once in the gap, extension arm 26 contacts the non-ramped surface of other extension so that extension arm 26 has to pivot before it can clear the extension. FIG. 14 shows another embodiment wherein a block 65 at the intermediate trip point includes a frictional surface 66 that tends to slow the movement of extension arm 26, thereby causing it to rotate as it moves past the intermediate trip point.

A gear rack may also be used for the shift mechanism as shown in FIG. 15. Extension arm 26 has a plurality of gear teeth 67 formed therein. At the intermediate trip point, gear teeth 67 interact with fixed gear teeth 68 on a fixed gear rack 69 so that extension arm 26 rotates in the manner desired to reorient the link between the first and second orientations.

While certain embodiments of the present invention have been described in detail, those familiar with the art to which this invention relates will recognize various alternative designs and embodiments for practicing the invention as defined by the following claims.

What is claimed is:

1. An apparatus for supporting a sliding door that moves between a closed position and a fully open position to selectively cover an opening in a vehicle, comprising:
    a door bracket for fixedly mounting to the sliding door;
    a primary track mounted along an exterior side of the vehicle and extending away from the opening to a remote end, the length of the primary track from the opening to the remote end being less than the distance traveled by the sliding door between the closed position and the fully open position;
    a roller bracket having rollers received by the primary track and movable between a first position proximate the opening and a second position at the remote end of the primary track;
    a link pivotally joined to the roller bracket by a first pivot and pivotally joined to the door bracket by a second pivot, wherein the link is rotatable around the first pivot between a first orientation for positioning the sliding door toward its closed position and a second orientation for positioning the sliding door toward the fully open position, wherein the link comprises an extension arm extending from the link generally toward the primary track, wherein the extension arm includes a roller mounted at the distal end thereof; and
    a shift mechanism contacting the extension arm when the roller bracket is at an intermediate trip point between the first position and the second position so that the link shifts from its first orientation to its second orientation when the sliding door is being opened and so that the link shifts from its second orientation to its first orientation when the sliding door is being closed, wherein the shift mechanism comprises a secondary track substantially parallel with the primary track and receiving the extension arm roller, and wherein the secondary track has a curved shape having a single point of maximum separation from the primary track at the intermediate trip point.

2. The apparatus of claim 1 wherein the extension arm is integrated with the link.

3. The apparatus of claim 1 wherein the shift mechanism comprises a cup pivotably mounted adjacent to the intermediate trip point of the primary track, wherein the cup receives the extension arm as the roller bracket passes through the intermediate trip point so that the link shifts between the first and second orientations.

4. The apparatus of claim 3 wherein the cup rotates between first and second alignments, and wherein the cup includes a detent for providing a predetermined resistance between the first and second alignments.

5. The apparatus of claim 1 wherein the shift mechanism comprises a rocker bar mounted adjacent to the intermediate trip point of the primary track, and wherein the rocker bar receives the extension arm as the roller bracket passes through the intermediate trip point so that the link shifts between the first and second orientations.

6. The apparatus of claim 5 wherein the rocker bar rotates between first and second alignments, and wherein the rocker bar includes a detent for providing a predetermined resistance between the first and second alignments.

7. The apparatus of claim 1 wherein the shift mechanism comprises a trip pin mounted adjacent to the intermediate trip point of the primary track, wherein the trip pin impacts the extension arm as the roller bracket passes through the intermediate trip point so that the link shifts between the first and second orientations.

8. The apparatus of claim 1 wherein the shift mechanism comprises a spring latch mounted adjacent to the intermediate trip point of the primary track, wherein the spring latch impacts the extension arm as the roller bracket passes through the intermediate trip point so that the link shifts between the first and second orientations.

9. The apparatus of claim 1 wherein the shift mechanism comprises a frictional surface mounted adjacent to the intermediate trip point of the primary track, wherein the frictional surface slidingly receives the extension arm as the roller bracket passes through the intermediate trip point so that the link shifts between the first and second orientations.

10. The apparatus of claim 1 wherein the extension arm includes a first geared edge, wherein the shift mechanism comprises a gear rack mounted adjacent to the intermediate trip point of the primary track, and wherein the first geared edge interfaces with the gear rack as the roller bracket passes through the intermediate trip point so that the link shifts between the first and second orientations.

11. A Sliding door apparatus for a vehicle having a door opening with a forward edge and a rearward edge, comprising:
    a sliding door selectively covering the door opening by moving between a closed position and a fully open position, the sliding door having a front edge and a back edge;

a door bracket for fixedly mounting to the sliding door near the back edge;

a primary track mounted along an exterior side of the vehicle and extending away from the rearward edge of the door opening to a remote end, the length of the primary track from the opening to the remote end being less than the distance traveled by the sliding door between the closed position and the fully open position;

a roller bracket having rollers received by the primary track and movable between a first position proximate the opening and a second position at the remote end of the primary track;

a link pivotally joined to the roller bracket by a first pivot and pivotally joined to the door bracket by a second pivot, wherein the link is rotatable around the first pivot between a first orientation for positioning the sliding door toward its closed position and a second orientation for positioning the sliding door toward the fully open position, wherein the link comprises an extension arm extending from the link generally toward the primary track, wherein the extension arm includes a roller mounted at the distal end thereof; and a shift mechanism contacting the extension arm when the roller bracket is at an intermediate trip point between the first position and the second position so that the link shifts from the first orientation to the second orientation when the sliding door is being opened and so that the link shifts from the second orientation to the first orientation when the sliding door is being closed, wherein the shift mechanism comprises a secondary track substantially parallel with the primary track and receiving the extension arm roller, and wherein the secondary track has an asymptotic shape having a single point of maximum separation from the primary track at the intermediate trip point.

12. The apparatus of claim 11 wherein the extension arm is integrated with the link.

13. An apparatus for supporting a sliding door that moves between a closed position and a fully open position to selectively cover an opening in a vehicle, comprising:

a door bracket for fixedly mounting to the sliding door;

a primary track mounted along an exterior side of the vehicle and extending away from the opening to a remote end, the length of the primary track from the opening to the remote end being less than the distance traveled by the sliding door between the closed position and the fully open position;

a roller bracket having rollers received by the primary track and movable between a first position proximate the opening and a second position at the remote end of the primary track;

a link pivotally joined to the roller bracket by a first pivot and pivotally joined to the door bracket by a second pivot, wherein the link is rotatable around the first pivot between a first orientation for positioning the sliding door toward its closed position and a second orientation for positioning the sliding door toward the fully open position, wherein the link comprises an extension arm extending from the link generally toward the primary track, wherein the extension arm includes a roller mounted at the distal end thereof; and a shift mechanism contacting the extension arm when the roller bracket is at an intermediate trip point between the first position and the second position so that the link shifts from its first orientation to its second orientation when the sliding door is being opened and so that the link shifts from its second orientation to its first orientation when the sliding door is being closed, wherein the shift mechanism comprises a secondary track substantially parallel with the primary track and receiving the extension arm roller, and wherein the secondary track has an asymptotic shape having a single point of maximum separation from the primary track at the intermediate trip point.

* * * * *